US010236495B2

(12) United States Patent
Ahn et al.

(10) Patent No.: US 10,236,495 B2
(45) Date of Patent: Mar. 19, 2019

(54) SECONDARY BATTERY

(71) Applicant: Samsung SDI Co., Ltd., Yongin-si, Gyeonggi-do (KR)

(72) Inventors: Byung Kook Ahn, Yongin-si (KR); Jae Hyeok Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 15 days.

(21) Appl. No.: 15/389,129

(22) Filed: Dec. 22, 2016

(65) Prior Publication Data

US 2017/0187026 A1 Jun. 29, 2017

(30) Foreign Application Priority Data

Dec. 23, 2015 (KR) .......................... 10-2015-0184713

(51) Int. Cl.
*H01M 2/34* (2006.01)
*H01M 2/06* (2006.01)

(52) U.S. Cl.
CPC ............ *H01M 2/348* (2013.01); *H01M 2/06* (2013.01); *H01M 2200/101* (2013.01); *H01M 2200/106* (2013.01)

(58) Field of Classification Search
None
See application file for complete search history.

(56) References Cited

U.S. PATENT DOCUMENTS

| 8,883,331 B2 | 11/2014 | Kim et al. | |
|---|---|---|---|
| 2013/0095363 A1* | 4/2013 | Yong | H01M 2/0473 429/120 |
| 2015/0004440 A1* | 1/2015 | Hwang | H01M 10/425 429/7 |

FOREIGN PATENT DOCUMENTS

| KR | 10-2005-0110504 A | 11/2005 |
|---|---|---|
| KR | 10-2010-0044487 A | 4/2010 |

* cited by examiner

*Primary Examiner* — Carmen V Lyles-Irving
(74) *Attorney, Agent, or Firm* — Knobbe Martens Olson & Bear LLP

(57) ABSTRACT

A secondary battery is disclosed. In one aspect, the secondary battery includes a case accommodating an electrode assembly, a cap plate sealing an opening of the case, an electrode terminal electrically connected to the electrode assembly and disposed over the cap, and an insulating member provided between the cap plate and the electrode terminal and configured to insulate the electrode terminal from the cap plate. The battery also includes a connection tab disposed over the electrode terminal, and a safety device having a portion positioned under the connection tab and electrically connected to the electrode terminal via the connection tab. The safety device has at least one of electric conductivity and thermal conductivity greater than that of the connection tab, and at least a part of the safety device is seated on the insulating member.

22 Claims, 6 Drawing Sheets

SECONDARY BATTERY

CROSS-REFERENCE TO RELATED APPLICATION

This application claims priority to and the benefit of Korean Patent Application No. 10-2015-0184713, filed on Dec. 23, 2015, in the Korean Intellectual Property Office, the entire contents of which are incorporated herein by reference in their entirety.

BACKGROUND

Field

The described technology generally relates to a secondary battery.

Description of the Related Technology

Unlike a primary battery, a secondary battery can be repeatedly charged and discharged. A low power secondary battery(s) can be used for portable electronic devices, such as a mobile phone, a notebook computer, and a camcorder, and a high power secondary battery(s) can be used as a power source for driving a motor of a hybrid, plug-in, all electric vehicle (EV) and the like.

Recently, market demand for a secondary battery has rapidly increased in correlation to the development of technology and production increase of portable consumer electronics. To increase the safety of the secondary battery, the secondary battery can be equipped with a safety device for sensing abnormal operation events of overheating and an over-current and performing a protection operation, such as stopping the flow of current.

SUMMARY OF CERTAIN INVENTIVE ASPECTS

One inventive aspect relates to a safety device, that can sense a temperature inside a secondary battery.

Another aspect is a secondary battery with reinforced fastening strength and mechanical hardness of a safety device.

Another aspect is a secondary battery, including: an electrode terminal, which is electrically connected with an electrode assembly, and is exposed on a cap plate sealing an opening of a case, in which the electrode assembly is accommodated; an insulating member provided on the cap plate, and configured to insulate the electrode terminal from the cap plate; a connection tab disposed on the electrode terminal; and a safety device, which has at least a predetermined area positioned under the connection tab, is electrically connected with the electrode terminal by the connection tab, and has at least one of electric conductivity and thermal conductivity higher than that of the connection tab, in which at least a part of the safety device is seated on the insulating member.

The safety device can include: a main body; a first lead, which is an arm terminal extended from one side of the main body; and a second lead, which is a base terminal extended from the other side of the main body and is connected with the first lead inside the main body.

The second lead can be positioned under the connection tab, so that the safety device can be electrically connected with the electrode terminal by the connection tab.

The connection tab can include a first area, which is in contact with the second lead, and a second area, which is extended from the first area and is in contact with the electrode terminal, and a width of the first area can be smaller than a width of the second area.

The second lead can be provided so that at least a part of the second lead is adjacent to the electrode terminal on the insulating member.

At least a part of the electrode terminal can protrude to an upper side of the insulating member, and the second lead can have a height corresponding to a protruding height of the electrode terminal from the insulating member.

The safety device can be formed of copper.

The connection tab can be formed of nickel.

Another aspect is a secondary battery, including: an electrode terminal, which is electrically connected with an electrode assembly, and is exposed on a cap plate sealing an opening of a case, in which the electrode assembly is accommodated; a connection tab disposed on the electrode terminal; and a safety device, which has at least a predetermined area positioned under the connection tab, is electrically connected with the electrode terminal by the connection tab, and has at least one of electric conductivity and thermal conductivity higher than that of the connection tab, in which the connection tab includes a first area, which is in contact with the safety device, and a second area, which is extended from the first area and is in contact with the electrode terminal, and a width of the first area is smaller than a width of the second area.

The safety device can be formed of copper.

The connection tab can be formed of nickel.

The safety device can include: a main body; a first lead, which is an arm terminal extended from one side of the main body; and a second lead, which is a base terminal extended from the other side of the main body and is connected with the first lead inside the main body.

The second lead can be positioned under the connection tab, so that the safety device can be electrically connected with the electrode terminal by the connection tab.

Another aspect is a secondary battery, comprising: a case accommodating an electrode assembly; a cap plate sealing an opening of the case; an electrode terminal electrically connected to the electrode assembly and disposed over the cap; an insulating member provided between the cap plate and the electrode terminal and configured to insulate the electrode terminal from the cap plate; a connection tab disposed over the electrode terminal; and a safety device having a portion positioned under the connection tab and electrically connected to the electrode terminal via the connection tab, wherein the safety device has at least one of electric conductivity and thermal conductivity greater than that of the connection tab, and wherein at least a part of the safety device is seated on the insulating member.

In the above secondary battery, the safety device includes: a main body having first and second sides opposing each other; a first lead including an arm terminal extending from the first side of the main body; and a second lead including a base terminal extending from the second side of the main body and connected to the first lead inside the main body.

In the above secondary battery, the second lead is positioned under the connection tab to electrically connect the safety device to the electrode terminal via the connection tab.

In the above secondary battery, at least a portion of the second lead is adjacent to the electrode terminal on the insulating member.

In the above secondary battery, at least a portion of the electrode terminal protrudes to an upper side of the insulating member, wherein the second lead has a height that is the same as that of the protruding portion of the electrode terminal.

In the above secondary battery, the connection tab includes i) a first region contacting the second lead and ii) a second region extending from the first region and contacting the electrode terminal, wherein the first region has a width less than that of the second region.

In the above secondary battery, the safety device further includes a positive temperature coefficient (PTC) device configured to expand when the temperature of the PTC device increases.

In the above secondary battery, the first and second leads are configured to electrically disconnect from each other when the PTC device expands.

In the above secondary battery, the safety device further includes a bi-metal part contacting the PTC device and configured to push the first lead upward to electrically disconnect the first and second leads from each other.

In the above secondary battery, the first and second leads completely overlap the PTC device in the height dimension of the secondary battery.

In the above secondary battery, the connection tab is flat.

In the above secondary battery, the safety device is formed of copper.

In the above secondary battery, the connection tab is formed of nickel.

Another aspect is a secondary battery, comprising: a case accommodating an electrode assembly; a cap plate sealing an opening of the case; an electrode terminal electrically connected to the electrode assembly and disposed over the cap plate; a connection tab disposed over the electrode terminal; and a safety device having a portion positioned under the connection tab and electrically connected to the electrode terminal via the connection tab, wherein the safety device has at least one of electric conductivity and thermal conductivity greater than that of the connection tab, wherein the connection tab includes i) a first region contacting the safety device and ii) a second region extending from the first region and contacting the electrode terminal, and wherein the first region has a width smaller than that of the second region.

In the above secondary battery, the safety device is formed of copper.

In the above secondary battery, the connection tab is formed of nickel.

In the above secondary battery, the safety device includes: a main body having first and second sides opposing each other; a first lead including an arm terminal extending from the first side of the main body; and a second lead including a base terminal extending from the second side of the main body and connected to the first lead inside the main body.

In the above secondary battery, the second lead is positioned under the connection tab to electrically connect the safety device to the electrode terminal via the connection tab.

Another aspect is a secondary battery, comprising: a case accommodating an electrode assembly; a cap plate sealing an opening of the case; an electrode terminal electrically connected to the electrode assembly and disposed over the cap plate; a connection tab disposed over the electrode terminal; and a safety device having a portion positioned under the connection tab and electrically connected to the electrode terminal via the connection tab, wherein the connection tab includes i) a first region contacting the safety device and ii) a second region extending from the first region and contacting the electrode terminal, and wherein the first region has a width smaller than that of the second region.

In the above secondary battery, the safety device has at least one of electric conductivity and thermal conductivity greater than that of the connection tab, and wherein at least a part of the safety device is seated on the insulating member.

According to at least one of the disclosed embodiments, the safety device is seated on the insulating member around the electrode terminal and is disposed to be adjacent to the electrode terminal, so that the safety device can sense an internal temperature of the secondary battery and rapidly perform a safety operation, thereby improving safety of the secondary battery.

Further, the safety device is connected to the electrode terminal by the connection tab, in such a manner that a width of a portion of the connection tab connected to the safety device is made to be relatively smaller than that of another portion, so that thermal resistance is increased, thereby improving temperature sensitivity of the safety device.

DETAILED DESCRIPTION OF CERTAIN INVENTIVE EMBODIMENTS

Figure 1:
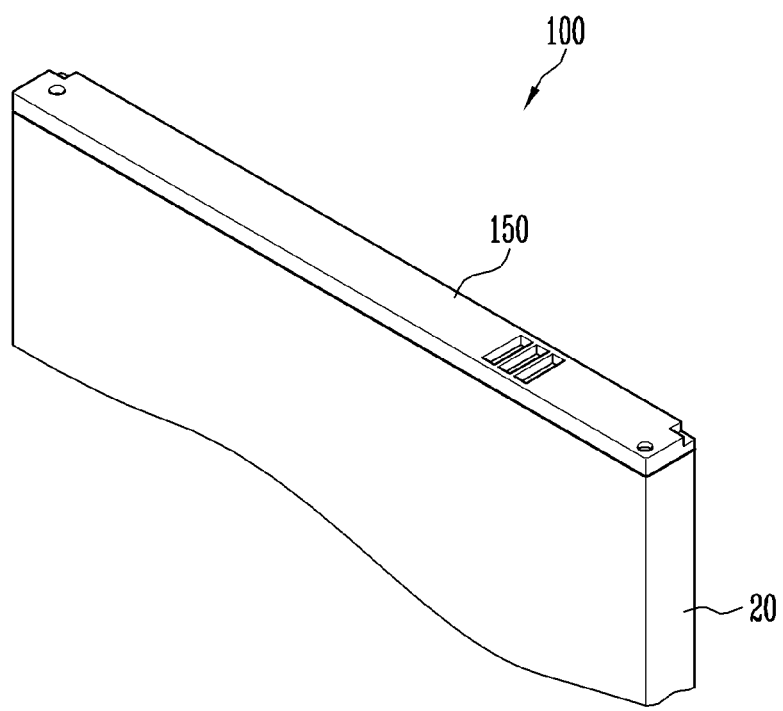
FIG. 1 is a perspective view of an upper portion of a secondary battery according to an exemplary embodiment of the present disclosure.

Example embodiments will now be described more fully hereinafter with reference to the accompanying drawings; however, they can be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions can be exaggerated for clarity of illustration. It will be understood that when an element is referred to as being "between" two elements, it can be the only element between the two elements, or one or more intervening elements can also be present. Like reference numerals refer to like elements throughout. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Figure 2:
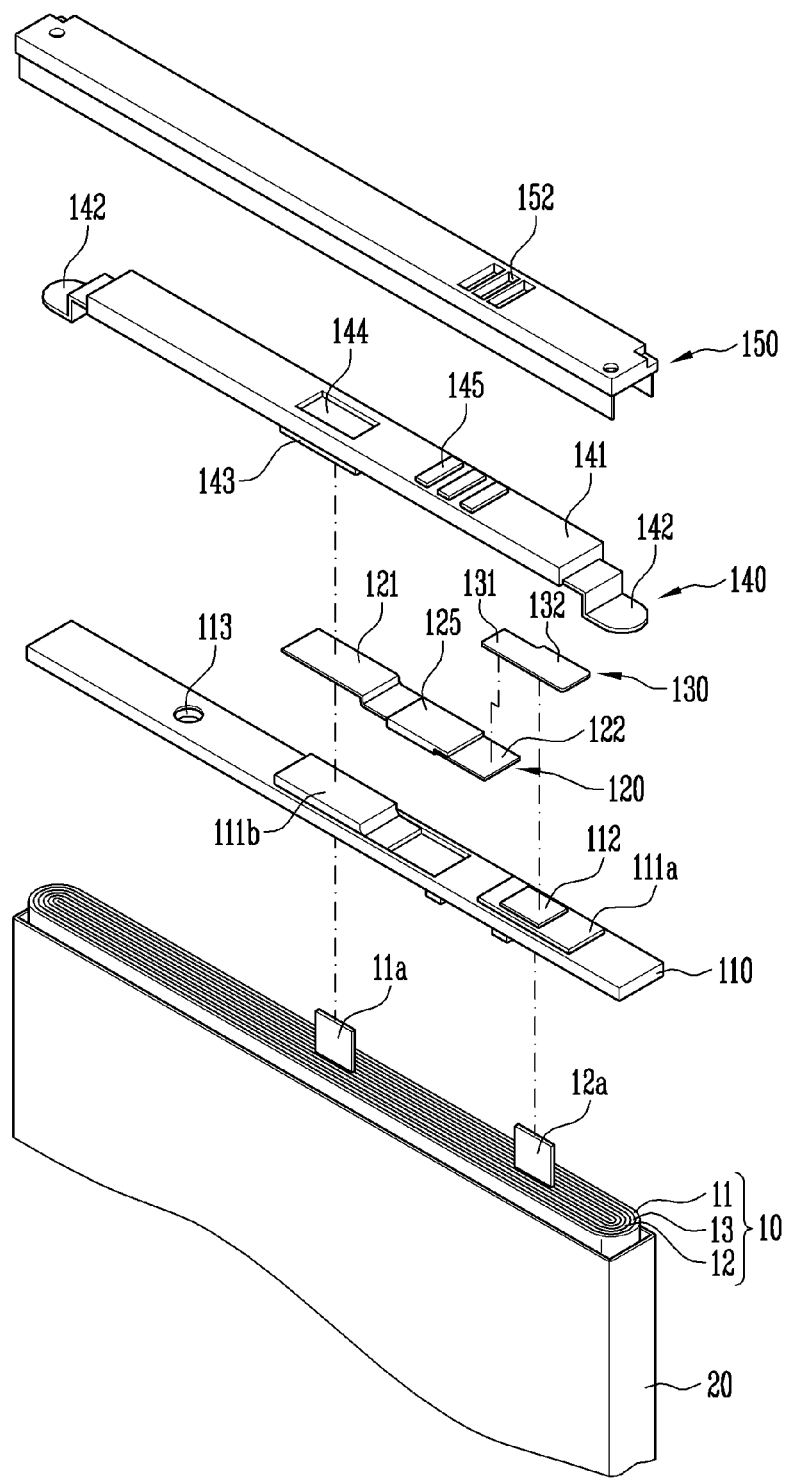
FIG. 2 is an exploded perspective view of FIG. 1.

FIG. 1 is a perspective view of an upper portion of a secondary battery 100 according to an exemplary embodiment of the present disclosure, and FIG. 2 is an exploded perspective view of FIG. 1.

As illustrated in FIGS. 1 and 2, the secondary battery 100 includes a cap plate 110 sealing an opening of a case 20, in which an electrode assembly 10 is accommodated, and an electrode terminal 112 electrically connected with the electrode assembly 10 and exposed on the cap plate 110. The secondary battery 100 also includes a connection tab 130 disposed on the electrode terminal 112, and a safety device 120 having at least a region positioned under the connection tab 130. The safety device 120 is electrically connected to the electrode terminal 112 by the connection tab 130.

The electrode assembly 10 is formed by winding a positive electrode 11, a separator 13, and a negative electrode 12 in a jelly-roll state. Each of the positive electrode 11 and the negative electrode 12 can include a coated portion formed by applying an active material onto a current collector of a metal plate, and a non-coated portion formed of a current collector, which is not applied with an active material and exposed. The positive electrode non-coated portion and the negative electrode non-coated portion are provided with a positive electrode tab 11a and a negative electrode tab 12a, respectively. In this case, the positive electrode tab 11a and the negative electrode tab 12a protrude to an upper side of the electrode assembly 10.

The case 20 can be formed in an approximately rectangular body so as to set a space accommodating the electrode assembly 10 and an electrolyte therein. An opening connecting an external space and an internal space is formed on one surface of the rectangular body. The opening can enable the electrode assembly 10 to be inserted into the case 20.

The cap plate 110 can be formed of the same material as that of the case 20 in order to improve weldability with the case 20. First and second insulating members 111a and 111b, which insulate the electrode terminal 112 and the safety device 120 from the cap plate 110, are provided on the cap plate 110.

In this case, the first insulating member 111a can be a gasket, which seals a through-hole, through which the electrode terminal 112 passes through.

Here, the electrode terminal 112 can be electrically connected to the negative electrode tab 12a of the electrode assembly 10, and the cap plate 110 can be electrically connected to the positive electrode tab 11a of the electrode assembly 10. Further, an electrolyte injection hole 113 can be provided at one side of the cap plate 110. The electrolyte injection hole 113 enables the electrolyte to be injected into the case 20 after the case 20 is coupled to the cap plate 110. After the electrolytic solution is injected, the electrolyte injection hole 113 is sealed by a sealing stopper.

The electrode terminal 112 includes a body part 112a, which is in contact with the negative tab 12a of the electrode assembly 10 and passes through predetermined areas of the cap plate 110 and the first insulating member 111a. The electrode terminal 112 also includes a protrusion 112b extended from the body part 112a and protruding to an upper side of the first insulating member 111a. The protrusion 112b can be electrically connected to a second lead 122 of the safety device 120, which is to be described below, by the connection tab 130. Further, the electrode terminal 112 can be a negative electrode terminal.

The safety device 120 is positioned on the cap plate 110, and serves to regulate a charging/discharging current or break a discharging current during an erroneous operation, such as overheating and an over-current. The safety device 120 can include a positive temperature coefficient device (PTC), a fuse, a current breaking device, a bi-metal, and the like. At least one of electric conductivity and thermal conductivity of the safety device 120 can be higher than that of the connection tab 130, and in this case, the safety device 120 can be copper, but is not limited thereto.

Further, the safety device 120 includes a main body 125 and first and second leads 121 and 122, which are extended from one side and the other side of the main body 125, respectively. A predetermined area of the second lead 122 can be positioned under the connection tab 130, which is to be described below, and be connected and fixed to one side of the connection tab 130 by welding so as to be protected. Accordingly, the safety device 120 can reinforce coupling strength and mechanical hardness of the connection tab 130. An example embodiment of the safety device 120 will be described with reference to FIG. 3 below.

Figure 3:
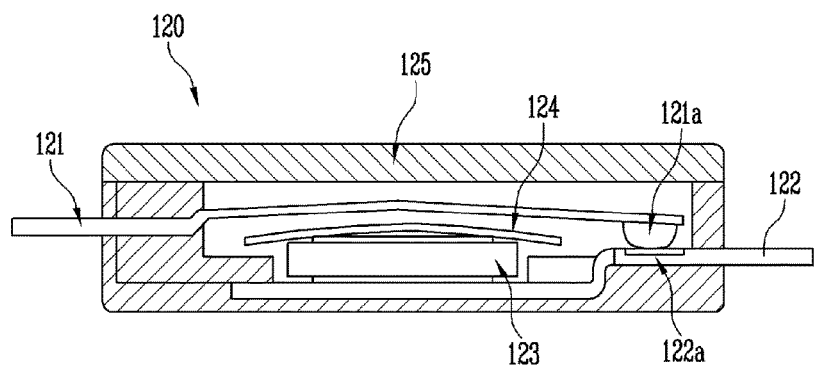
FIG. 3 is a cross-sectional view of a safety device according to an exemplary embodiment of the present disclosure.

FIG. 3 is a cross-sectional view of the safety device 120 according to the exemplary embodiment of the present disclosure.

Referring to FIG. 3, the safety device 120 can protect the battery from an over-current or an abnormal temperature increase, and can include the aforementioned first lead 121, second lead 122, and body 125. The body 125 can be provided with a resin case and the like, and a PTC 123 and a bi-metal 124 can be embedded in the body 125.

The first lead 121 is an arm terminal, and at least a part of the first lead 121 can protrude to the outside of the body 125. The protruding portion can be connected to the protection circuit module 140. In this case, the first lead 121 is connected with the second lead 122, which is a base terminal, inside the body 125.

The first lead 121 can be bent and/or curved at a predetermined position of an external side or an internal side of the body 125 in an upper direction between one end connected to the protection circuit module 140 and the other end connected to the second lead 122. The first lead 121 can be spaced apart from the bi-metal 124 within the body 125 in an upper direction.

The second lead 125 is a base terminal, and at least a part of the second lead can protrude to the outside of the body 125 at an opposite side of the first lead 121. The protruding portion can be connected to the electrode terminal 112 by the connection tab 130.

Further, the second lead 122 can be provided as a separate component and coupled to the body 125, or can be integrated with the body 125 by insert molding. The same is also applied to the first lead 121.

A height of the part of the first lead 121 protruding to the outside of the body 125 can be different from a height of the part of the second lead 122 protruding to the outside of the body 125. For example, the part of the first lead 121 connected with the protection circuit module 140 can be higher than the part of the second lead 122 connected with the electrode terminal 112.

The second lead 122 can be disposed in a state where the first lead 121 is in contact with the second lead 122. For example, in order to secure the exact contact, contact points 121a and 122a are provided in the first lead 121 and the second lead 122, and at least the contact point 121a provided in the first lead 121 can protrude in a direction towards the second lead 122.

The PTC 123 and the bi-metal 124 can be sequentially laminated on the second lead 122 within the body 125, and the first lead 121 can be provided on the bi-metal 125 while being spaced apart from the bi-metal 125.

The PTC 123 transfers heat to the bi-metal 124 when a current flows. The PTC 123 is an element generating the large amount of heat and maintaining a high temperature when the current flows. A ceramic sintered body or one obtained by dispersing conductive particles such as carbon in a polymer can be used.

The PTC 123 can be provided on the second lead 122 within the body 125. When the PTC 123 is electrically connected between the first lead 121 and the second lead 122 by the bi-metal 124 which is changed when an abnormal temperature is generated in the electrode terminal 112, the contact points 121a and 122a of the first lead 121 and the second lead 122 can be separated from each other by deforming the bi-metal 124 by discharging heat.

The bi-metal 124 can be provided on the PTC 123 and be deformed by heat to separate the first lead 121 and the second lead 122. The bi-metal 124 can have conductivity together with the PTC 123, but does not have a contact point or a wire for making electricity flow. In some embodiments, the bi-metal 124 is not in contact with the first lead 121, and can be movably installed in a free state on the PTC 123.

When the secondary battery 100 of the present disclosure is in a safe state, a current flows between the first lead 121 and the second lead 122 by the contact points 121 and 122a, and the PTC 123 and the bi-metal 124 are maintained in a state where a current does not flow.

However, when a temperature of the electrode terminal 112 is equal to or greater than an abnormal temperature, heat is transferred to the body 125 through the second lead 122 and the bi-metal 124 comes to be in contact with the first lead 121 while being curved. For example, the first lead 121, the bi-metal 124, and the PTC 123, and the second lead 122 are electrically connected while the bi-metal 124 is electrically connected with the PCT 123 so that a current flows in the PTC 123.

When the current flows, the PTC 123 generates the large amount of heat and a temperature of the PTC 123 is increased, and the heat generated by the PTC 123 heats the bi-metal 124. The bi-metal 124 can cut off current between the first lead 121 and the second lead 122 while pushing up the first lead 121. In this case, most of the current flowing in the PTC 123 is used for heating, so that the PTC 123 is substantially in a current breaking state, thereby maintaining safety of the secondary battery 100.

As described above, in the safety device 120 having the first lead 121 which is an arm terminal, and the second lead which is the base terminal, a part connected to the electrode terminal 112 can be the second lead 122 which is the base terminal, and this will be described in detail with reference to FIG. 4.

Figure 4:
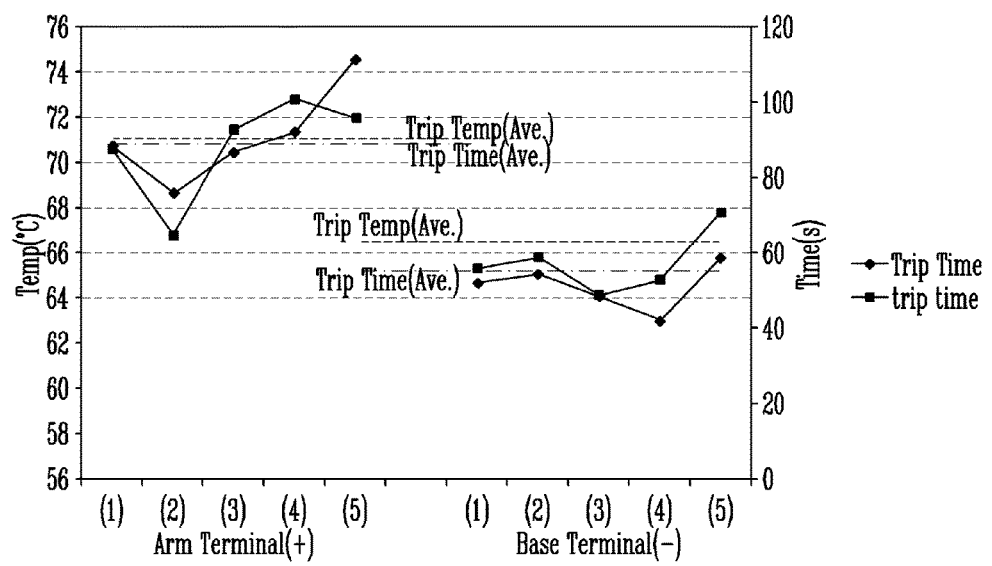
FIG. 4 is a trip experiment graph according to a connection of the safety device according to an exemplary embodiment of the present disclosure.

FIG. 4 is a trip experiment graph according to a connection of the safety device 120 according to the exemplary embodiment of the present disclosure. In this disclosure, a trip is when the circuit breaks, caused by the safety device 120, due to an abnormal activity in the secondary battery, such as overheating or over-current.

Referring to FIG. 4, the left side represents a trip temperature and a trip time when the electrode terminal 112 is connected to the first lead 121 which is the arm terminal, and the protection circuit module 140 is connected to the second lead 122 which is the base terminal. The right side represents a trip temperature and a trip time when the electrode terminal 112 is connected to the second lead 122 which is the base terminal, and the protection circuit module 140 is connected to the first lead 121 which is the arm terminal.

Reviewing the Table below and the graph, it can be seen that a trip temperature and a trip time when the electrode terminal 112 is connected to the first lead 121 are relatively higher and longer than those of a case where the electrode terminal 112 is connected to the second lead 122.

That is, in the present disclosure, the safety device 120 more sensitively reacts to a temperature of the electrode terminal 112 by connecting the electrode terminal 112 to the second lead 122 of the safety device 120, thereby effectively protecting the secondary battery 100.

TABLE 1

| | Arm terminal(+) | | | Base Terminal(−) | |
|---|---|---|---|---|---|
| | Trip temp(° C.) | trip time(s) | | Trip temp(° C.) | trip time(s) |
| (1) | 70.8 | 88 | (1) | 64.7 | 56 |
| (2) | 68.7 | 65 | (2) | 65.1 | 59 |
| (3) | 70.5 | 93 | (3) | 64.1 | 49 |
| (4) | 71.4 | 101 | (4) | 63 | 53 |
| (5) | 74.6 | 96 | (5) | 65.8 | 71 |
| Ave. | 71.2 | 88.6 | Ave. | 64.54 | 57.6 |

The connection tab 130 mediates a close thermal contact between the safety device 120 and the electrode terminal 112. To this end, the connection tab 130 can be formed of nickel. However, the connection tab 130 is not limited thereto.

Further, the connection tab 130 includes a first area 131 which is in contact with the second lead 122, and a second area 132 which is extended from the first area 131 and is in contact with the electrode terminal 112. The first area 131 and the second area 132 can be positioned on the same plane to closely connect the safety device 120 and the electrode terminal 112. The first area 131 and the second area 132 of the connection tab 130 will be described below.

The protection circuit module 140 is positioned on the cap plate 110 and is electrically connected with the electrode assembly 10, and can include a substrate 141, lead tabs 142 mounted to the substrate 141, an opening 144, a connection part 143 provided on the opening 144 and connected with the second lead 122, and a charging/discharging terminal 145.

Here, the charging/discharging terminal 145 is a portion which is in contact with a terminal of an external device, and can be charged or discharged through the external device. A charger can be connected to the charging/discharging terminal 145, so that the charging can be performed, or a load can be connected to the charging/discharging terminal 145, so that the discharging can be performed.

An upper case 150 is combined with any one of the protection circuit module 140 and the electrode assembly 11 to insulate the protection circuit module 140 and to protect the protection circuit module 140 from external impact.

Further, a charging/discharging terminal hole 152, which exposes a terminal surface of the charging/discharging terminal 145 formed in the protection circuit module 140, can be formed in the upper case 150.

Figure 5:
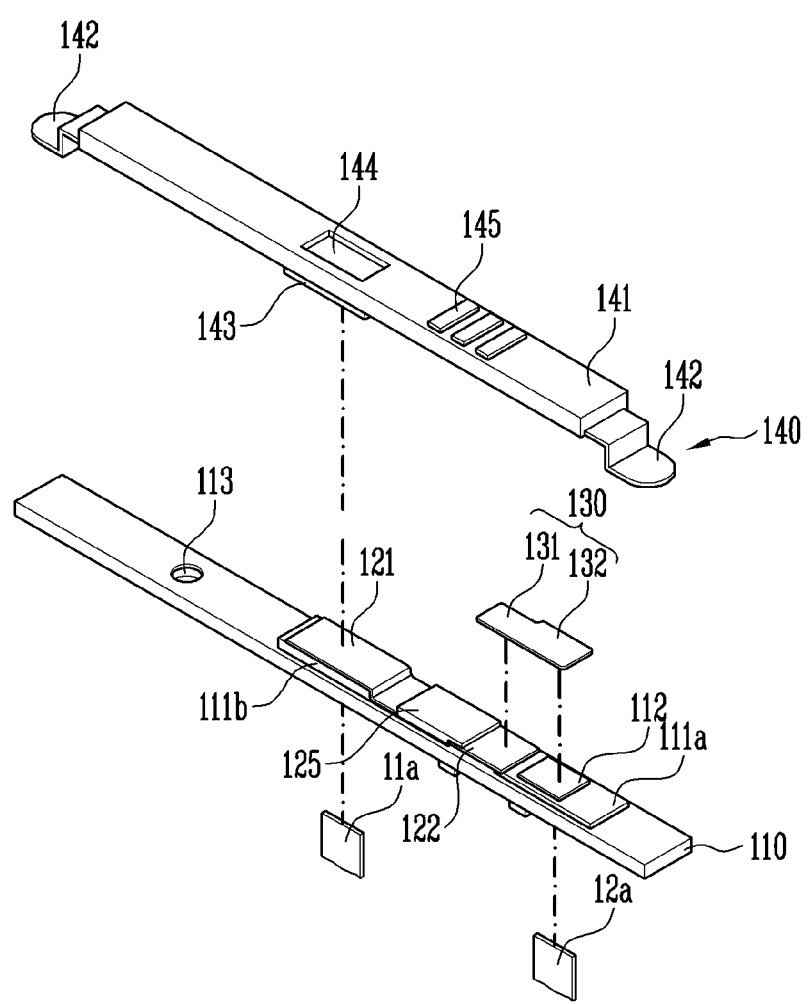
FIG. 5 is a perspective view illustrating a state, in which the safety device is mounted to an upper portion of a cap plate according to the exemplary embodiment of the present disclosure.

FIG. 5 is a perspective view illustrating a state, in which the safety device 120 is mounted to an upper portion of the cap plate 110 according to the exemplary embodiment of the present disclosure.

Hereinafter, a connection relation of the safety device 120 will be described in detail with reference to FIG. 5 together with FIGS. 2 and 3.

As illustrated in FIGS. 2, 3, and 5, the safety device 120 includes the main body 125 and the first and second leads 121 and 122 extended from one side and the other side of the main body 125, respectively. A lower surface of the first lead 121 can be in contact with a second insulating member 111b and an upper surface of the first lead 121 can be in contact with a connection part 143 of the protection circuit module 140.

Further, at least an area of a lower surface of the second lead 122 can be positioned in the first insulating member 111a, and an upper surface of the second lead 122 can be connected with the electrode terminal 112 by the connection tab 130.

The second lead 122 can be seated on the first insulating member 111a and be provided to be adjacent to the electrode terminal 112. For example, the second lead 122 and the electrode terminal are spaced apart from each other with a gap of about 0.2 mm to about 1 mm (for example, about 0.5 mm). In this case, heat of the electrode terminal 112 can be effectively transferred by the second lead 122, so that it is possible to stably protect the secondary battery 100. This will be described with reference to FIGS. 6A and 6B.

Figure 6A:
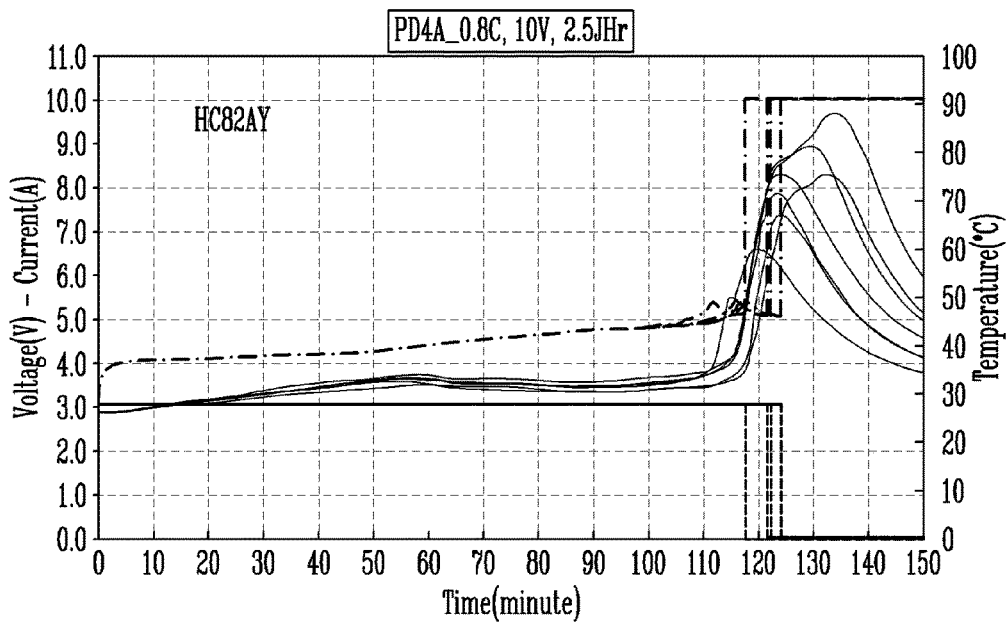
FIGS. 6A and 6B are trip experiment graphs according to a position of the safety device according to the exemplary embodiment of the present disclosure.
Figure 6B:
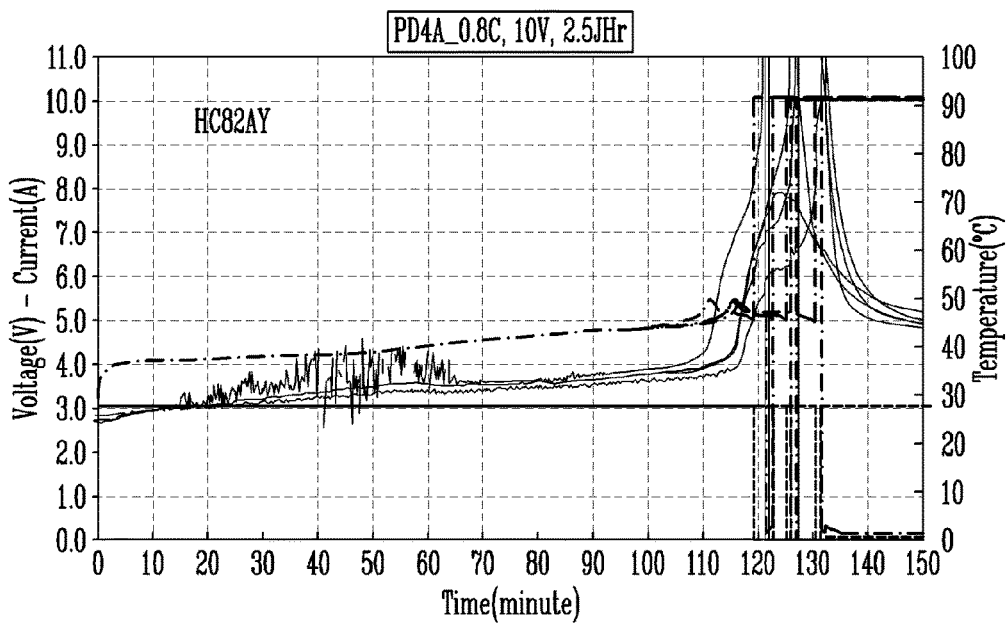

FIGS. 6A and 6B are trip experiment graphs according to a position of the safety device 120 according to the exemplary embodiment of the present disclosure.

FIG. 6A represents a change in a current, a voltage, and a temperature represented according to the amount of time elapsed when the second lead 122 and the electrode terminal 112 have a gap by about 0.5 mm. FIG. 6B represents a change in a current, a voltage, and a temperature when the second lead 122 and the electrode terminal 112 have a gap by about 8.5 mm. Referring to the graphs, in general, when time passes, a voltage is gradually increased, and when a predetermined time elapses, the voltage is sharply increased, a current is substantially uniformly maintained. When a predetermined time elapses, the current is sharply decreased, and when a time passes, a temperature is gradually increased and then is increased according to the sharp change of the current and the voltage.

The safety device 120 can be disposed to be closer to the electrode terminal 112 than the upper surface of the cap plate 110 while the second lead 122 is seated on the first insulating member 111a. For example, when an adjacent distance between the safety device 120 and the electrode terminal 112 is considerably decreased, it is possible to guarantee a stable trip as illustrated in FIG. 6A.

For example, in the case of FIG. 6B, because the safety device 120 fails to properly sense an abnormal temperature, there occurs a serious problem in that the secondary battery 100 is partially exploded during the over-charging. However, in the case of FIG. 6A, because the safety device 120 stably senses an abnormal temperature, a problem in that the secondary battery 100 is exploded during the over-charging is not generated at all, thereby securing safety of the secondary battery 100.

Accordingly, in the present disclosure, the safety device 120 is disposed to be adjacent to the electrode terminal 112 while being electrically connected between the connection part 143 of the substrate 141 and the electrode terminal 112 of the cap plate 110, so that when a temperature is excessively increased or an excessive current flows, it is possible to rapidly and stably break the electrical connection between the connection part 143 of the protection circuit module 140 and the electrode terminal 112.

Figure 7:
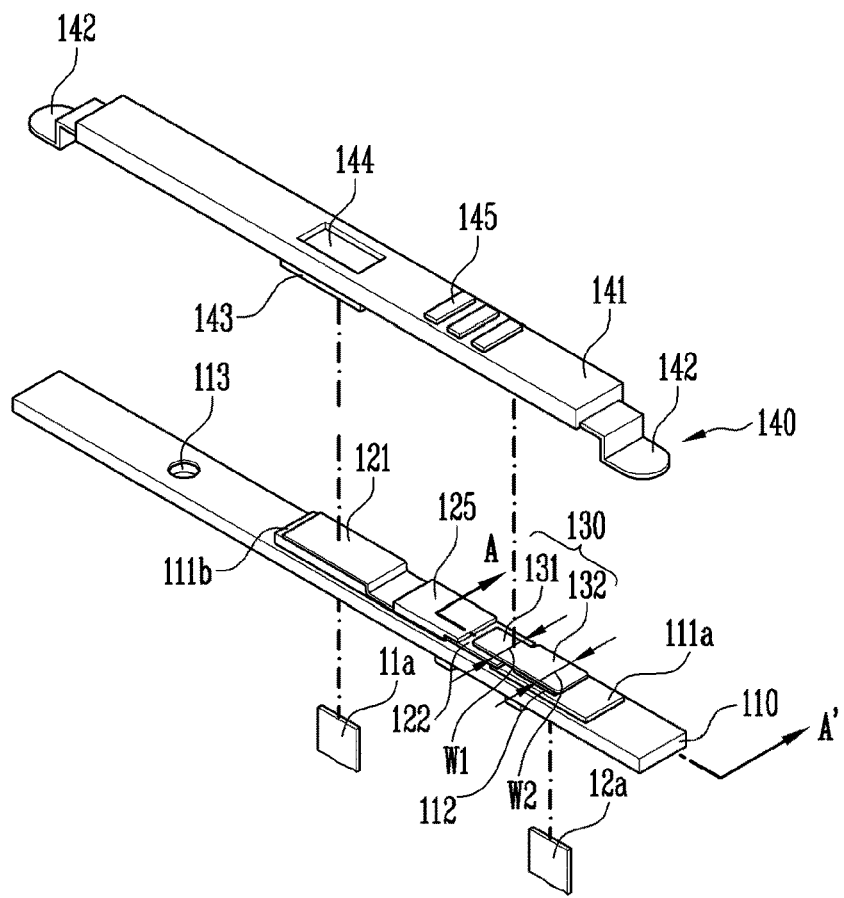
FIG. 7 is a perspective view illustrating a state, in which a connection tab is mounted to the safety device and an electrode terminal according to an exemplary embodiment of the present disclosure.

FIG. 7 is a perspective view illustrating a state, in which the connection tab 130 is mounted to the safety device 120 and the electrode terminal 112 according to an exemplary embodiment of the present disclosure.

Referring to FIG. 7, the connection tab 130 includes the first area 131 connected with the second lead 122, and the second area 132 extended from the first area 131 and connected with the electrode terminal 112. In this example, the first area 131 overlaps the second lead 122 and is fixed and connected to the second lead 122 by welding. Accordingly, even if external impact is applied to the secondary battery 100, it is possible to prevent the safety device 120 from being separated from the cap plate 110 or damaged.

In the connection tab 130, a width W1 of the first area 131 can be smaller than a width W2 of the second area 132. In this example, when the connection tab 130 and the second lead 122 are welded (for example, spot-welded), thermal resistance in the first area 131 having the smaller width is large, so that efficiency of welding is improved.

Further, when thermal resistance of the first area 131 is increased, trip sensitivity can be increased because the safety device 120 is connected to the first area 131. In general, a trip temperature has an error range, and when the width of the first area 131 is smaller than that of the second area 132, a temperature in the second area 131 is locally increased compared to the second area 132, so that it is possible to solve a problem in that a trip is not generated by the error range.

Accordingly, in the present disclosure, the safety device 120 connected to the first area 131 by the second lead 122 can more stably electrically protect the secondary battery by increasing thermal resistance of the first area 131 by making the width W1 of the first area 131 and the width W2 of the second area 132 be different from each other.

The width W2 of the second area 132 can be formed to be larger than the width W1 of the first area, so that a contact surface area with the electrode terminal 112 can be sufficiently secured. That is, the second area 132 can be formed to have substantially the same width as or a width larger than that of the electrode terminal 112 so as to be sufficiently in contact with an upper surface of the electrode terminal 112.

Accordingly, the connection tab 130 has a wide contact surface with the electrode terminal 112, so that the connection tab 130 can more efficiently transfer heat so that the safety device 120 can sense an internal temperature of the secondary battery 100.

Figure 8:
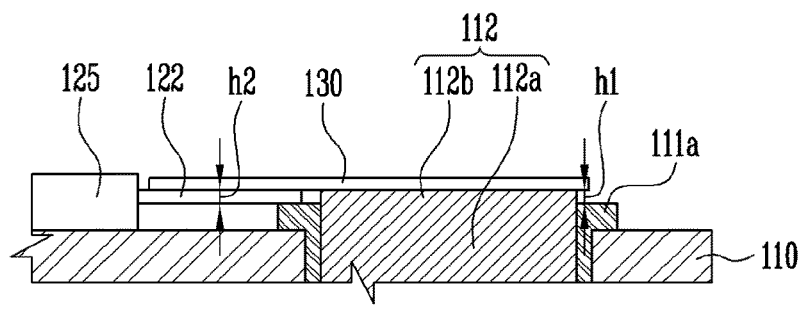
FIG. 8 is a cross-sectional view taken along line A-A' of FIG. 4.

FIG. 8 is a cross-sectional view taken along line A-A' of FIG. 4.

Referring to FIG. 8, the second lead 122 of the safety device 120 of the present disclosure is provided at a position close to the electrode terminal 112 as possible on the first insulating member 111a, so as to sense abnormality within the secondary battery 100. For example, the electrode terminal 112 includes the body part 112a, which is in contact with the negative tab 12a of the electrode assembly 10 and passes through predetermined areas of the cap plate 110 and the first insulating member 111a, and the protrusion 112b extended from the body part 112a and protruding to the upper side of the first insulating member 111a. For example, a height h2 of the second lead 122 is formed to correspond to a height h1 of the protrusion 112b.

Accordingly, a contact area with the connection tab 130, which connects the second lead 122 and the protrusion 112b, can be maximized, and thus, it is possible to more rapidly sense abnormality within the secondary battery 100, thereby improving safety of the secondary battery 100.

Further, the upper surface of the second lead 122 and the upper surface of the electrode terminal 112 are laid on the same plane, so that the connection tab 130 can connect the second lead 122 and the electrode terminal 112 by using a flat lower surface thereof. Accordingly, the present disclosure can decrease manufacturing cost and guarantee sensitivity of the trip of the safety device 120.

In the aforementioned secondary battery 100, the safety device 120 is provided to be adjacent to the cap plate 110 and the electrode terminal 112, so that the safety device 120 can sense an internal temperature of the secondary battery 100 and rapidly perform a safety operation.

Further, the safety device 120 is positioned under the connection tab 130, so that the safety device 120 is fixed by welding together with the connection tab 130. Accordingly, even if external impact and the like is applied to the secondary battery 100, it is possible to prevent the safety device 120 from being separated from the cap plate 110 or damaged, thereby reinforcing fastening strength and mechanical hardness of the safety device 120.

As described above, even though the inventive technology has been described in detail with the exemplary embodiment, it is apparent that the present disclosure is not limited to the exemplary embodiment, but various modifications and changes can be made without departing from the main principle of the present disclosure.

What is claimed is:

1. A secondary battery, comprising:
   a case accommodating an electrode assembly;
   a cap plate sealing an opening of the case;
   an electrode terminal electrically connected to the electrode assembly and disposed over the cap plate;
   an insulating member provided between the cap plate and the electrode terminal and configured to insulate the electrode terminal from the cap plate;
   a connection tab disposed over the electrode terminal, wherein the connection tab has a varying width; and
   a safety device having a portion positioned under the connection tab and electrically connected to the electrode terminal via the connection tab, wherein the safety device has at least one of electric conductivity and thermal conductivity greater than that of the connection tab, wherein at least a part of the safety device is seated on the insulating member, wherein the safety device includes a main body and first and second leads respectively extending from first and second sides of the main body, wherein the connection tab is directly positioned above and directly contacts the second lead of the safety device and the electrode terminal, and wherein one end of the connection tab is positioned between the electrode terminal and the main body of the safety device.

2. The secondary battery of claim 1,
   wherein the first lead includes an arm terminal extending from the first side of the main body, and
   wherein the second lead includes a base terminal extending from the second side of the main body and connected to the first lead inside the main body.

3. The secondary battery of claim 2, wherein the second lead is positioned under the connection tab to electrically connect the safety device to the electrode terminal via the connection tab.

4. The secondary battery of claim 3, wherein at least a portion of the second lead is adjacent to the electrode terminal on the insulating member.

5. The secondary battery of claim 4, wherein at least a portion of the electrode terminal protrudes to an upper side of the insulating member, and wherein the second lead has a height that is the same as that of the protruding portion of the electrode terminal.

6. The secondary battery of claim 2, wherein the connection tab includes i) a first region contacting the second lead and ii) a second region extending from the first region and contacting the electrode terminal, and wherein the first region has a width less than that of the second region.

7. The secondary battery of claim 2, wherein the safety device further includes a positive temperature coefficient (PTC) device configured to expand when the temperature of the PTC device increases.

8. The secondary battery of claim 7, wherein the first and second leads are configured to electrically disconnect from each other when the PTC device expands.

9. The secondary battery of claim 8, wherein the safety device further includes a bi-metal part contacting the PTC device and configured to push the first lead upward to electrically disconnect the first and second leads from each other.

10. The secondary battery of claim 9, wherein the first and second leads completely overlap the PTC device in the height dimension of the secondary battery.

11. The secondary battery of claim 1, wherein the connection tab is flat.

12. The secondary battery of claim 1, wherein the safety device is formed of copper.

13. The secondary battery of claim 1, wherein the connection tab is formed of nickel.

14. A secondary battery, comprising:
    a case accommodating an electrode assembly;
    a cap plate sealing an opening of the case;
    an electrode terminal electrically connected to the electrode assembly and disposed over the cap plate;
    a connection tab disposed over the electrode terminal; and
    a safety device having a portion positioned under the connection tab and electrically connected to the electrode terminal via the connection tab, wherein the safety device has at least one of electric conductivity and thermal conductivity greater than that of the connection tab,
    wherein the connection tab includes i) a first region contacting the safety device and ii) a second region extending from the first region and contacting the electrode terminal, wherein the first region has a width smaller than that of the second region,
    wherein the safety device includes a main body and first and second leads respectively extending from first and second sides of the main body, wherein the connection tab is directly positioned above and directly contacts the second lead of the safety device and the electrode terminal, and wherein one end of the connection tab is positioned between the electrode terminal and the main body of the safety device.

15. The secondary battery of claim 14, wherein the safety device is formed of copper.

16. The secondary battery of claim 14, wherein the connection tab is formed of nickel.

17. The secondary battery of claim 14,
    wherein the first lead includes an arm terminal extending from the first side of the main body, and
    wherein the second lead includes a base terminal extending from the second side of the main body and connected to the first lead inside the main body.

18. The secondary battery of claim 17, wherein the second lead is positioned under the connection tab to electrically connect the safety device to the electrode terminal via the connection tab.

19. A secondary battery, comprising:
    a case accommodating an electrode assembly;

a cap plate sealing an opening of the case;
an electrode terminal electrically connected to the electrode assembly and disposed over the cap plate;
a connection tab disposed over the electrode terminal; and
a safety device having a portion positioned under the connection tab and electrically connected to the electrode terminal via the connection tab,
wherein the connection tab includes i) a first region contacting the safety device and ii) a second region extending from the first region and contacting the electrode terminal, wherein the first region has a width smaller than that of the second region,
wherein the safety device includes a main body and first and second leads respectively extending from first and second sides of the main body, wherein the connection tab is directly positioned above and directly contacts the second lead of the safety device and the electrode terminal, and wherein one end of the connection tab is positioned between the electrode terminal and the main body of the safety device.

20. The secondary battery of claim 19, further comprising an insulating member interposed between the cap plate and the electrode terminal, wherein the safety device has at least one of electric conductivity and thermal conductivity greater than that of the connection tab, and wherein at least a part of the safety device is seated on the insulating member.

21. The secondary battery of claim 6, wherein the first region overlaps the second lead in the height dimension of the case.

22. The secondary battery of claim 21, wherein the first region is in direct physical contact with the second lead.

* * * * *